United States Patent Office 3,403,160
Patented Sept. 24, 1968

3,403,160
DI-β-PYRIDYL METHYL ESTERS OF ISOCINCHOMERONIC ACID
Bo Thuresson af Ekenstam, Molndal, and Carl Göran Claeson, Goteborg, Sweden, assignors to Aktiebolaget Bofors, Bofors, Sweden
No Drawing. Filed June 22, 1966, Ser. No. 559,400
Claims priority, application Sweden, June 28, 1965, 8,480/65
1 Claim. (Cl. 260—295.5)

ABSTRACT OF THE DISCLOSURE

Di-β-pyridyl methyl ester of 2,5-isocinchomeronic acid and a method for its preparation having vasodilating properties of long duration with a minimum of strong side effects which is characteristic of other vasodilating agents.

The present invention relates to novel esters. It particularly relates to esters of pyridine-2,5-dicarboxylic acid (isocinchomeronic acid) or derivatives thereof and β-pyridyl carbinol or its derivates.

The novel esters are useful compounds producing both external and internal vasodilating effects. In particular, the ester of isocinchomeronic acid and β-pyridyl carbinol is highly soluble in water making it easy to administer.

The novel ester of isocinchomeronic acid and β-pyridyl carbinol hydrolyzes to form 2 molecules of β-pyridyl carbinol and one molecule of pyridine-2,5-dicarboxylic acid, which in turn by decarboxylation at the 2-position gives 1 molecule of nicotinic acid.

The vasodilating effect of the novel esters is mild but of long duration, and is of value in medicinal practice, particularly for the group of patients who experience strong side effects from other vasodilating agents.

The novel esters are readily prepared through the use of known methods of esterification. Preferably, we prepare the esters by the reaction between an isocinchomeronic acid dichloride and a β-pyridyl carbinol. In carrying out the reaction we allow a pyridine compound of the formula:

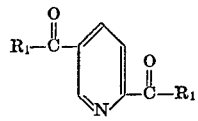

to react with a second pyridine compound with the formula:

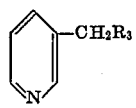

to form an ester of the formula:

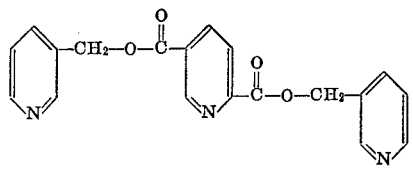

in which $R_1$ can be either an OH group, a chlorine atom, a bromine atom or an $OR_2$ group, in which $R_2$ is a metal atom, e.g. sodium or potassium. $R_3$ can be an OH group, a chlorine atom, a bromine atom or an $OR_2$ group, in which $R_2$ is the same as above.

The invention will be described in more detail in the following example.

EXAMPLE

In a 1000 ml. reaction vessel, 98 g. of β-pyridyl carbinol is mixed with 86 g. of triethyl amine and 300 g. of benzene, while stirring, after which 90 g. of isocinchomeronyl chloride, dissolved in 100 g. of benzene, is added dropwise, with continued stirring and cooling. The stirring is continued for a further 24 hours at room temperature. The precipitate which forms is filtered and washed with water to remove the triethylamine hydrochloride. The remaining crystalline mass is dissolved in 700 g. of boiling ethyl alcohol, followed by treatment with active carbon and filtering. Upon slow cooling, 95 g. (67%) of pyridine-2,5-dicarboxylic acid-di (β-pyridyl carbinol ester) is crystallized. The melting point is 142–143° C.

We claim:
1. An ester of isocinchomeronic acid and β-pyridyl carbinol of the formula

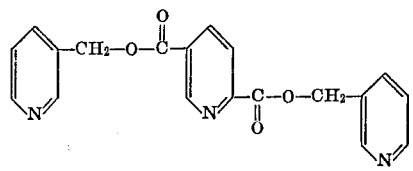

References Cited

Ustavshchikov et al.: Chem. Abstracts, vol. 58, par. 2341 (1963).

HENRY R. JILES, *Primary Examiner.*

A. L. ROTMAN, *Assistant Examiner.*